(12) United States Patent
Heiden

(10) Patent No.: US 8,305,587 B2
(45) Date of Patent: Nov. 6, 2012

(54) APPARATUS FOR THE OPTICAL INSPECTION OF WAFERS

(75) Inventor: Michael Heiden, Woelfersheim (DE)

(73) Assignee: KLA-Tencor MIE GmbH, Weilburg (DE)

( * ) Notice: Subject to any disclaimer, the term of this patent is extended or adjusted under 35 U.S.C. 154(b) by 243 days.

(21) Appl. No.: 12/806,405

(22) Filed: Aug. 12, 2010

(65) Prior Publication Data

US 2011/0090483 A1 Apr. 21, 2011

(30) Foreign Application Priority Data

Oct. 20, 2009 (DE) .......................... 10 2009 044 294

(51) Int. Cl.
*G01B 11/14* (2006.01)
(52) U.S. Cl. .................................. 356/614; 250/559.36
(58) Field of Classification Search .......... 356/614–623, 356/399–401, 237.1–237.5; 250/559.36
See application file for complete search history.

(56) References Cited

U.S. PATENT DOCUMENTS

| | | | |
|---|---|---|---|
| 6,347,458 B1 | 2/2002 | Kaczynski | 33/503 |
| 6,542,251 B2 | 4/2003 | Mueller-Rentz | 356/614 |
| 6,545,279 B1 * | 4/2003 | Yoshida et al. | 250/341.4 |
| 6,816,253 B1 | 11/2004 | Blaesing-Bangert et al. | 356/244 |
| 6,920,249 B2 | 7/2005 | Rinn et al. | 382/199 |
| 6,960,755 B2 | 11/2005 | Kaczynski | 250/221 |
| 7,420,670 B2 | 9/2008 | Rinn et al. | 356/237.4 |
| 7,986,409 B2 * | 7/2011 | Heiden | 356/399 |
| 2006/0007442 A1 | 1/2006 | Heerens et al. | 356/401 |
| 2008/0013089 A1 * | 1/2008 | Ishii et al. | 356/400 |
| 2009/0011525 A1 * | 1/2009 | Yamamoto et al. | 438/7 |
| 2009/0097041 A1 | 4/2009 | Heiden | 356/616 |

FOREIGN PATENT DOCUMENTS

| | | |
|---|---|---|
| DE | 198 58 428 | 7/2000 |
| DE | 199 48 797 C2 | 5/2001 |
| DE | 100 42 140 A1 | 3/2002 |

(Continued)

OTHER PUBLICATIONS

Dr. Carola Bläsing: Pattern Placement Metrology for Mask making, The presentation was given at the conference Semicon, Education Program, on Mar. 31, 1998 in Geneva.

*Primary Examiner* — Hoa Pham
(74) *Attorney, Agent, or Firm* — Davidson, Davidson & Kappel, LLC

(57) ABSTRACT

A metrology tool (1) for measuring the positions of structures (32) on a mask surface (31) is disclosed. On a measuring stage (33) a reflector (36) selective with respect to the wavelength is provided, which essentially reflects light within a first wavelength region emitted from a first illumination device (10), and essentially does not reflect light within a second wavelength region emitted from a second illumination device (20). The reflector (36) selective with respect to the wavelength preferentially is a dichroic mirror. By detecting the light within the first wavelength region reflected by the reflector (36) the position of predefined sections of outer edges (37) of the mask is determined. The light from the second wavelength region is used for determining the coordinates of structures on the mask. Due to the selectivity with respect to the wavelength of the reflector (36) this determination of coordinates is not perturbed by a reflection of the light within the second wavelength region from the reflector (36).

15 Claims, 4 Drawing Sheets

FOREIGN PATENT DOCUMENTS

| | | |
|---|---|---|
| DE | 100 47 211 A1 | 5/2002 |
| DE | 101 06 699 | 8/2002 |
| DE | 10 2004 023 739 | 12/2005 |
| DE | 10 2007 049 100 | 4/2009 |
| DE | 10 2008 002 780 A1 | 9/2009 |
| JP | 2000-012 420 | 1/2000 |

* cited by examiner

APPARATUS FOR THE OPTICAL INSPECTION OF WAFERS

This patent application claims the benefit of German Patent Application No. 1 04.4, filed on Oct. 20, 2009, and hereby incorporated by reference herein.

FIELD OF THE INVENTION

The invention relates to a metrology tool for determining the coordinates of structures on the surface of a mask.

BACKGROUND OF THE INVENTION

A metrology tool for measuring structures on wafers and on masks used in the manufacture thereof is described in detail in the manuscript of the presentation "Pattern Placement Metrology for Mask Making" by Dr. Carola Biasing, issued for the conference Semicon, Education Program in Geneva on Mar. 31, 1998. The description therein relates to the fundamentals of a metrology tool. The structures of wafers or on masks used for exposure only permit very narrow tolerances. For checking these structures therefore a very high precision of measurement (currently in the nanometer to subnanometer region) is required. A method and a metrology tool for determining the position of such structures is known from the German patent application DE 100 47 211 A1. For details on the mentioned determination of positions explicit reference to this document is made.

The German patent DE 1 04 B4 discloses a method for determining the position of edge sections in a mask coordinate system. In a metrology tool the mask is placed on a measurement stage which is displaceable orthogonally to the optical axis of an imaging measurement system, the displacement of the measurement stage being interferometrically measured. The position of a mask coordinate system with respect to the coordinate system of the metrology tool is determined based on at least two structures on the mask. The relative distance of one of at least the first and the second outer edge to the at least two structures is determined. The metrology tool determines the actual coordinates of the at least two structures to the respective outer edges, which must not exceed a certain deviation from a reference value.

Furthermore a metrology tool is known from a plurality of patent applications, like for instance from DE 19858428, from DE 10106699, or from DE 102004023739. In all prior art documents mentioned a metrology tool is disclosed with which structures on a substrate can be measured. Therein the substrate is placed on a measuring stage movable in X-coordinate direction and in Y-coordinate direction. The metrology tool therein is set up in such a way that the positions of the structures, or of the edges of the structures, respectively, are determined with an objective. For determining the position of the structures, or of their edges, respectively, it is necessary for the position of the measuring stage to be determined with at least one interferometer. Finally the position of the edge with respect to a coordinate system of the metrology tool is determined.

The masks to be measured in a metrology tool are intended for the exposure of wafers in an exposure apparatus. For this purpose they are inserted into a mask frame in the exposure apparatus. In order for the insertion to occur in a reproducible manner, the mask makes contact with three points for lateral guidance; these contact points are also known as banking points. For the manufacture of wafers the position of the structures on the mask with respect to these contact points is important, in particular as within the exposure apparatus the mask can only be moved to a certain extent in order to correct deviations of the positions of the structures on the mask from an ideal position. In order to determine this relative position, in the mask coordinate system both the positions of the structures on the mask and the positions of the predefined sections of the outer edges, which in the exposure apparatus make contact with the contact points, are determined.

In a prior art metrology tool a reflection means on the measuring stage or on the mask frame is used to determine the position of the outer edge from the measured brightness distribution of the reflected light via image processing. Visible light (wavelength region approximately 400 nm to 750 nm) is used for this position determination. For measuring the coordinates of structures UV light (365 nm, 266 nm, 248 nm, 193 nm, . . . ) is used. The prior art reflection means is a metal mirror also reflecting the UV light. This reflection perturbs the measurement of the coordinates of structures and reduces the precision of the measurement, a fact which is unacceptable in view of modern and future chip generations.

SUMMARY OF THE INVENTION

It is an object of the invention to set up a metrology tool in such a way that the determination of the position of predefined sections of the outer edges of the mask with respect to the mask coordinate system is possible without perturbing reflections of UV light from the reflection means used.

The present invention provides a metrology tool for determining the position of structures on a surface of a mask comprising:
- a measuring stage movable in a X-coordinate direction and in a Y-coordinate direction, into which the mask to be measured is placeable;
- a first illumination device emitting light in a first wavelength region;
- a second illumination device emitting light in a second wavelength region;
- at least one reflector, which is assigned essentially to the first illumination device for determining the position of predefined sections of outer edges of the mask with respect to a mask coordinate system, wherein the reflection means is selective with respect to the wavelength in such a way as to cause an essentially complete reflection of light from the first illumination device and to cause essentially no reflection of the light from the second illumination device.

A metrology tool as used according to the invention for the determination of the position of structures on a surface of a mask comprises a measuring stage movable in X-coordinate direction and in Y-coordinate direction. In this measuring stage a mask to be measured is placed. The metrology tool according to the invention comprises a first illumination device and a second illumination device. The first illumination device emits light in a first wavelength region; in preferred embodiments this is the wavelength region of visible light, i.e. light from the wavelength region from about 400 nm to 750 nm. The second illumination device emits light in a second wavelength region, which in preferred embodiments is in the UV region (wavelength below 400 nm). In a particularly preferred embodiment one of the wavelengths 365 nm, 266 nm, 248 nm, and 193 nm is used. Furthermore in the metrology tool according to the invention a reflection means is provided, which is selective with respect to the wavelength and which preferentially is a dichroic mirror. In preferred embodiments of the invention the reflector or reflection means is provided on the measuring stage or on a mask frame at least in the region of one of the outer edges of the mask. The reflector reflects the light from the first illumination device essentially completely; after detection of this reflected light therefrom the position of the outer edge of the mask can be determined by image processing. The light within the second wavelength region is used for the determination of the coordinates of the structures on the surface of the mask. The selectivity with respect to wavelength of the reflection means according to the invention is such that there is essentially no reflection of the light in the second wavelength region. Thus in comparison with a prior art metrology tool the determination of the coordinates of structures is not perturbed by the light in the second wavelength region reflected by the reflector.

BRIEF DESCRIPTION OF THE DRAWINGS

Below embodiments shall illustrate the invention and its advantages with reference to the accompanying figures.

DETAILED DESCRIPTION

Figure 1:
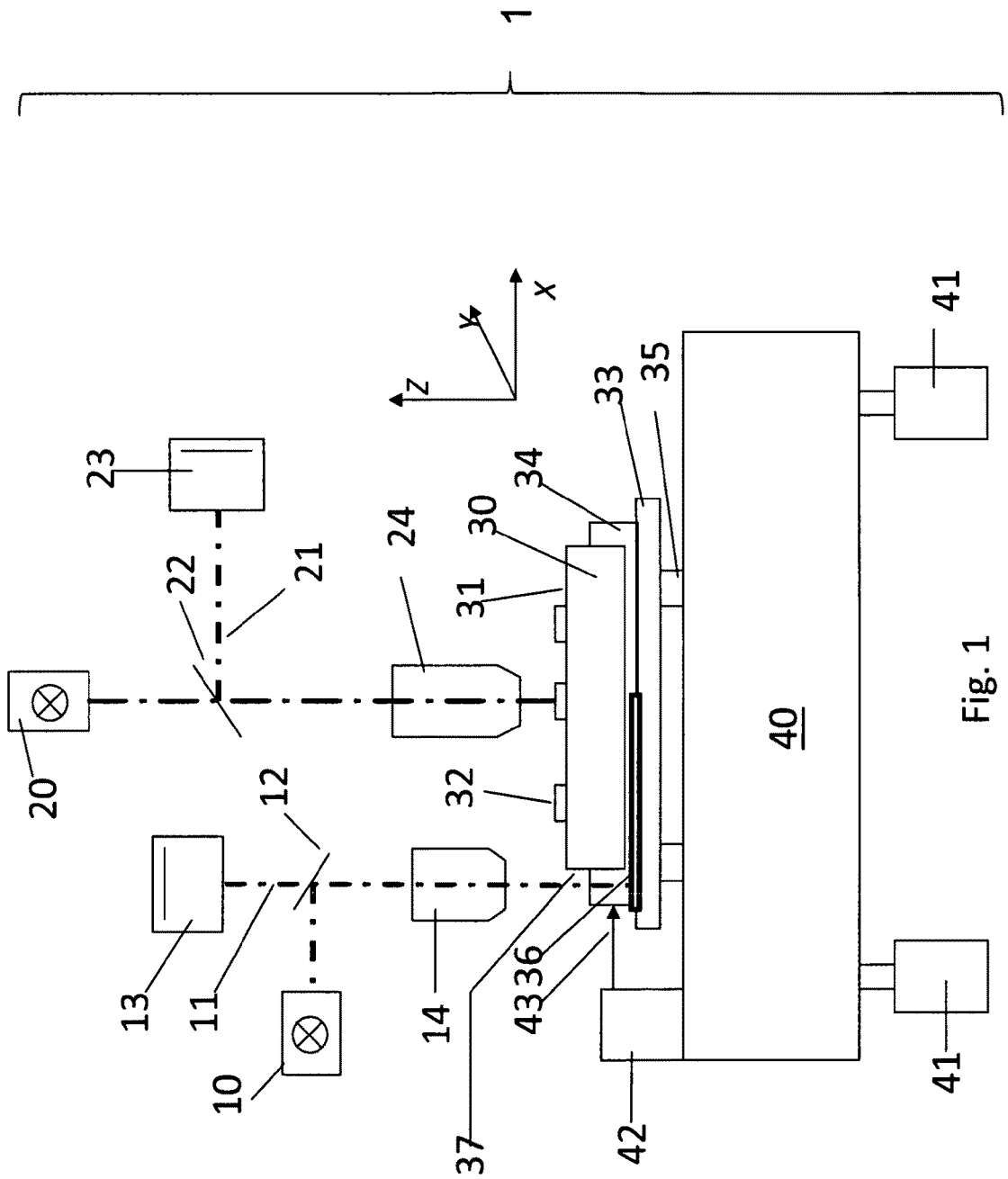
FIG. 1 shows a metrology tool.

Identical reference numerals are used for like elements of the invention or elements of like function. Furthermore only those reference numerals are shown in the individual figures which are required for the description of the respective figure.

FIG. 1 shows a metrology tool 1. A mask 30 carrying the structures 32 to be measured on an upper side 31 is placed in a mask frame 34 on a measuring stage 33. The measuring stage 33 is movably supported on a base 40 by bearings 35. In preferred embodiments the bearings 35 are air bearings, and the base 40 is a block of granite. The displacement of the measuring stage 33 on the base 40 is determined by at least one laser-interferometer 42, which emits at least one measurement laser beam 43. The base 40 and thus the metrology tool 1 is largely decoupled from vibrations of the floor through vibration damped supports 41. A first illumination device 10 emits light in a first wavelength region, which is coupled into a first measuring light path 11 by a first beam splitter 12. A first detector unit 13 and a first measuring objective 14 are assigned to the first measuring light path 11. The first measuring light path 11 with the assigned elements 13 and 14 cooperates with a reflector 36 provided on the measuring stage 33 in order to determine the position of predefined sections of an outer edge 37 of the mask 30. A second illumination device 20 emits light in a second wavelength region, which is coupled into a second measuring light path 21 by a second beam splitter 22. A second detector unit 23 and a second measuring objective 24 are assigned to the second measuring light path 21. The second measuring light path 21 with the assigned elements 23 and 24 is used for measuring the coordinates of the structures 32 on the surface 31 of the mask 30. According to prior art the reflector 36 is a metal mirror, which reflects light in the first wavelength region and in the second wavelength region to a considerable extent. Light in the second wavelength region reflected by the reflector 36 perturbs the measurement of the coordinates of the structures 32. In the metrology tool 1 according to the invention the reflector 36 is selective with respect to wavelength in such a way that the light in the first wavelength region is reflected essentially completely, and that the light in the second wavelength region is essentially not reflected; the reflector 36 for example is a dichroic mirror.

The choice of an embodiment of the metrology tool 1 for FIG. 1 is not by way of a limitation of the invention. The metrology tool 1 may in particular, besides the first illumination device 10 and the second illumination device 20, comprise further illumination devices, for example a transmitted light illumination device, with assigned light paths and optical elements. The representation of FIG. 1 is limited to the elements relevant for establishing the technical context of the invention.

Figure 2:
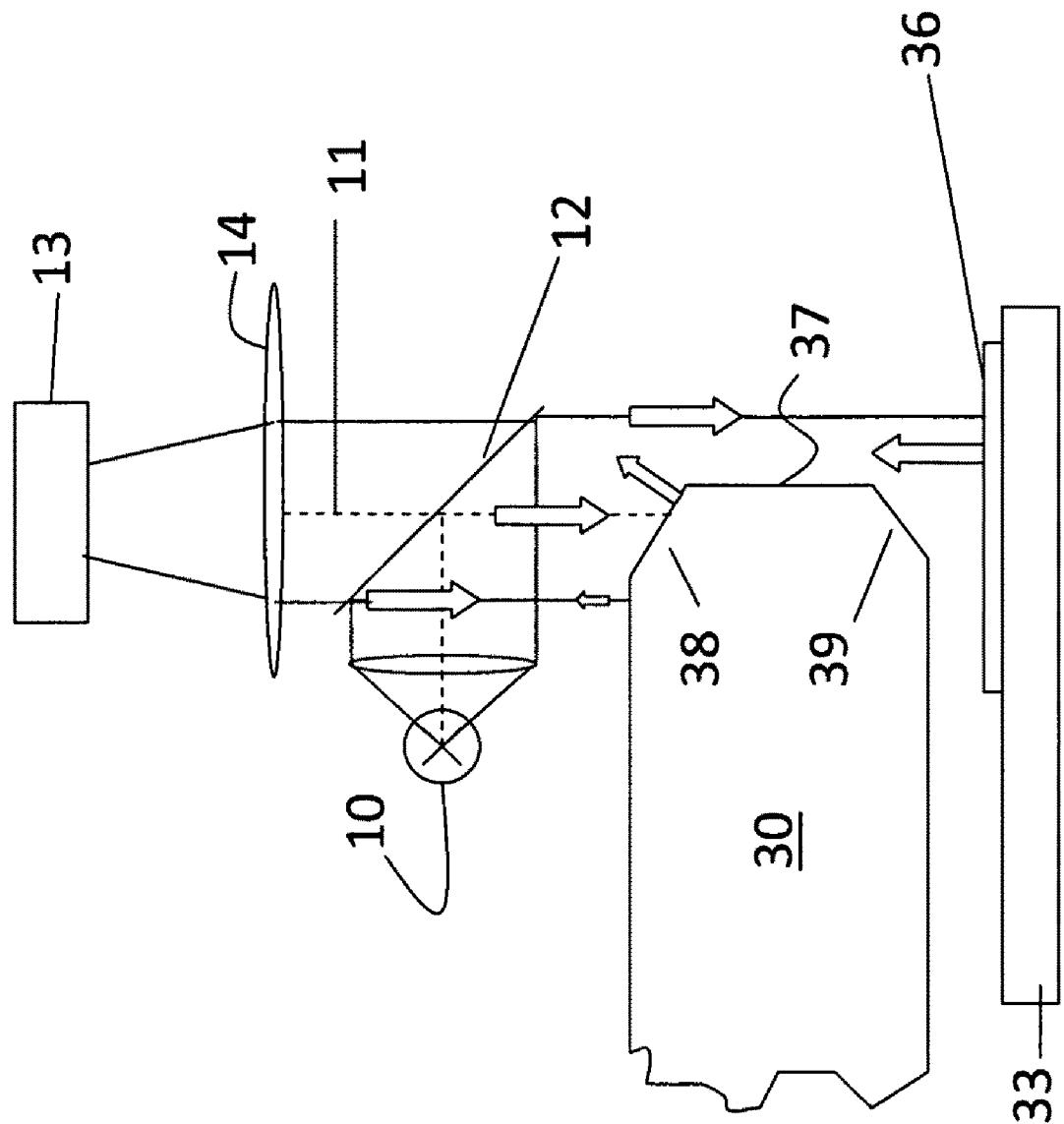
FIG. 2 shows a schematic representation of the illumination of an outer edge of a mask.

FIG. 2 schematically shows the capture of an image of the mask in the region of the outer edge 37. For this purpose the mask 30 is illuminated by the first illumination device 10 with light in the first wavelength region. The parallelized light reaches the region of the outer edge 37 of the mask 30 via the first beam splitter 12. The mask 30 exhibits a top chamfer 38 and a bottom chamfer 39 in the region of the outer edge 37. The incident light from the first illumination device 10 is reflected out of the first measuring light path 11 by the top chamfer 38, so that the first measuring objective 14 receives less light from this region of the top chamfer 38 than from surrounding regions. Below the mask the reflector 36 is located, which completely reflects the light from the first wavelength region, so that much light reaches the first measuring objective 14 from this region. The incident quantities of light are represented in FIG. 2 by corresponding arrows, wherein the reflector 36 is essentially completely reflective. The portions of light incident and reflected by the reflector 36 are represented by arrows of equal size. Corresponding further representations show the portion of the light proceeding from the mask 30. In an alternative embodiment not shown here an objective is provided between the first beam splitter 12 and the mask 30, and a lens is provided in the light path, so that the setup of a classical bright field microscope is realized. In this case the light in the region of the first beam splitter 12 need not be parallelized. In any case a sufficient depth of field of the setup is necessary, so that light from the reflector 36 reaches the first detector unit 13.

Figure 3:
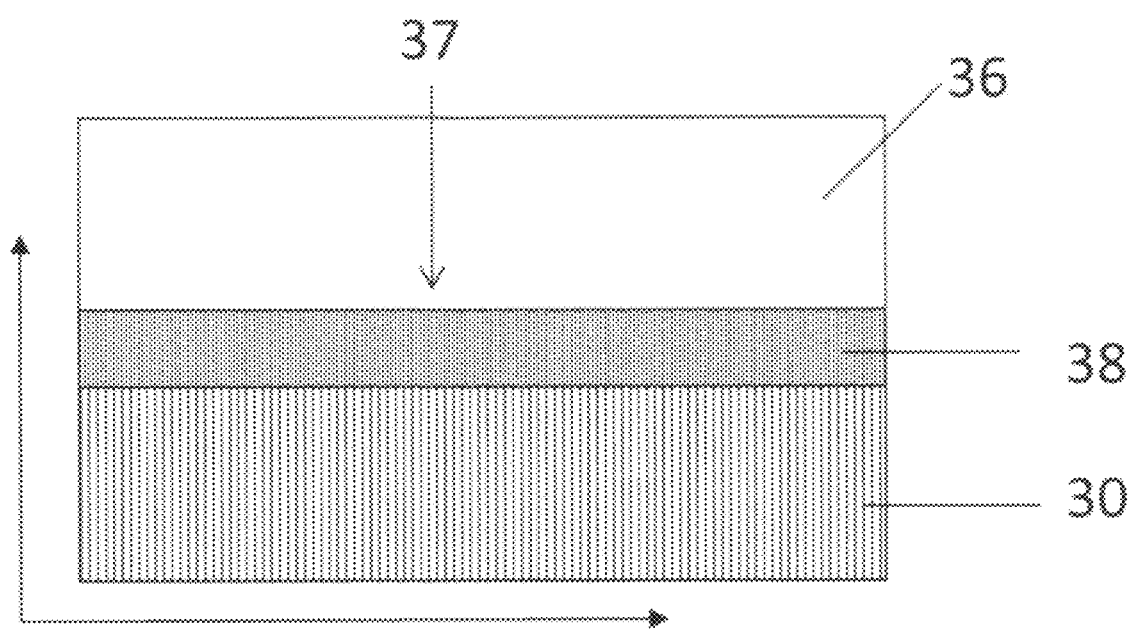
FIG. 3 shows a schematic representation of an image of an outer edge of a mask.

FIG. 3 shows a schematic representation of an image of a region around the outer edge 37 of the mask 30. As already explained in the context of FIG. 2 the measuring objective 14 receives less light from the region of the top chamfer 38 than from the surrounding regions, so that this region appears as a dark or dimly illuminated strip in the image shown of the edge region of the mask 30. As the region of the mask 30 abutting the top chamfer 38 is weakly reflecting, little light is reflected from this region, and thus little light reaches the detector, so that this area, too, is dimly illuminated, but nonetheless somewhat better illuminated than the top chamfer 38. The region outside the mask 30 receives light from the reflector 36 on the measuring stage 33, so that this region is well illuminated, and the position of the outer edge 37 thus can be determined with high precision due to the strong contrast.

Figure 4A:
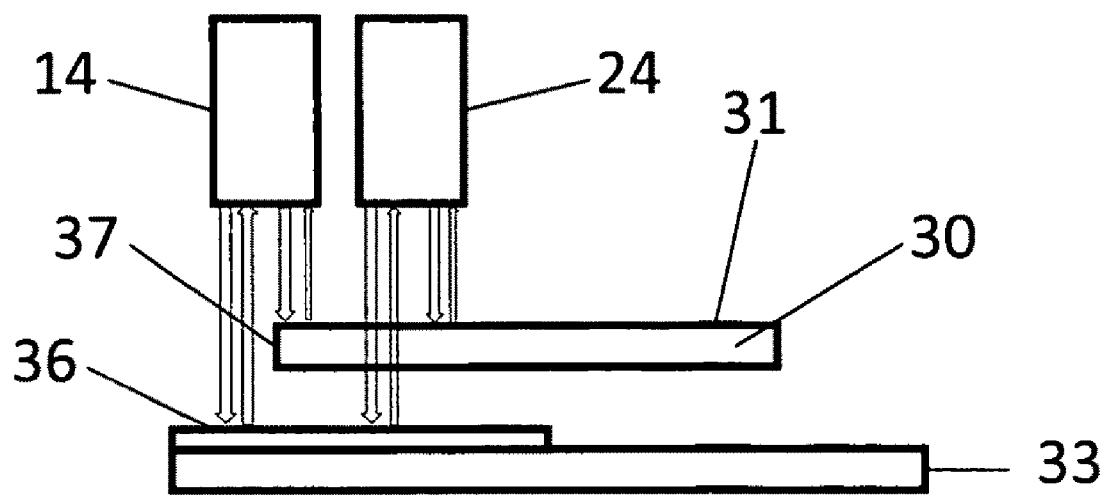
FIG. 4a shows a determination of edges and structures according to prior art.

FIG. 4a schematically shows a determination of the position of the outer edge and a measurement of the structures on the mask surface according to prior art. Light in the first wavelength region passes the first measuring objective 14 in the direction of the mask 30 and is reflected by the reflector 36 provided on the mask stage 33, the reflector 36 being a metal mirror according to prior art. Therefrom the position of the edge 37 of the mask 30 can be determined, as described in the context of FIGS. 2 and 3. When measuring the structures 32 (not explicitly shown here) on the mask surface 31 light in the second wavelength region passes the second measuring objective 24 in the direction of the mask 30 and is reflected, in part by the mask surface 31, in part after passing the mask 30 by the reflector 36. The light reflected by the reflector 36 perturbs the measurement of the structures 32 on the mask surface 31.

Figure 4B:
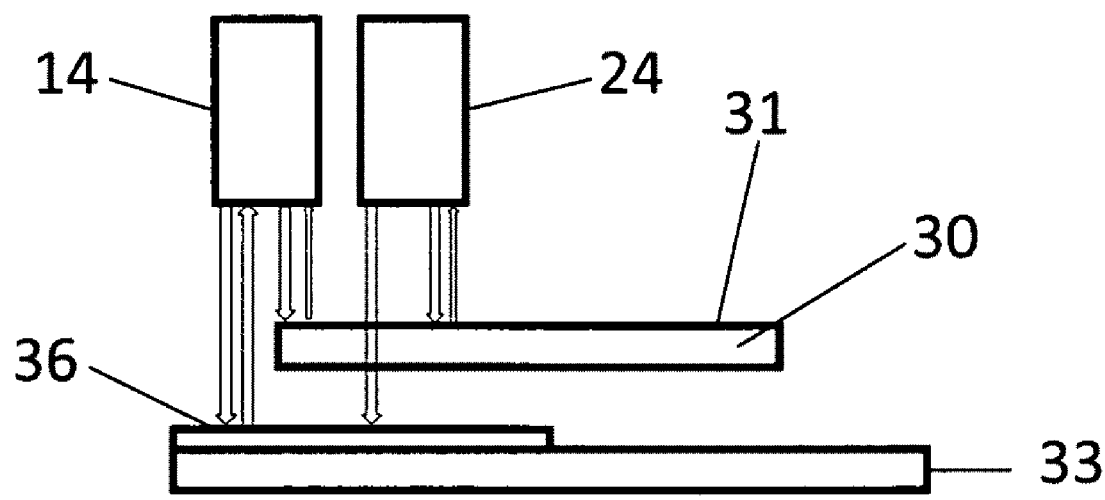
FIG. 4b shows a determination of edges and structures according to the invention.

FIG. 4b schematically shows a determination of the position of the outer edge and a measurement of the structures on the mask surface with a metrology tool according to the invention. Light in the first wavelength region passes the first measuring objective 14 in the direction of the mask 30 and is reflected essentially completely by the reflector 36 provided on the mask stage 33, the reflector 36 according to the invention exhibiting a selectivity with respect to wavelength and preferentially being a dichroic mirror. Therefrom the position of the outer edge 37 of the mask 30 can be determined, as described in the context of FIGS. 2 and 3. When measuring the structures 32 (not explicitly shown here) on the mask surface 31 light in the second wavelength region passes the second measuring objective 24 in the direction of the mask 30, and is reflected in part by the mask surface 31. Light in the second wavelength region passing the mask 30 essentially is not reflected by the reflector 36 exhibiting, according to the invention, a selectivity with respect to wavelength. Therefore the measurement of structures 32 on the mask surface 31 in contrast to the prior art metrology tool (see FIG. 4a) is not perturbed by reflections of light in the second wavelength region from the reflector 36.

The present invention has been described with reference to preferred embodiments in order to design an apparatus for the optical inspection of the surface of a wafer in such a way that a reliable high quality detection of the surface of the wafer is possible. Independently of that alterations and modifications of individual elements of the apparatus for the optical inspection of the surface of the wafer are possible, without leaving the scope of the subsequent claims.

What is claimed is:

1. A metrology tool for determining a position of structures on a surface of a mask comprising:
    a measuring stage movable in a X-coordinate direction and in a Y-coordinate direction, the mask to be measured being placeable on the measuring stage;
    a first illuminator emitting light in a first wavelength region;
    a second illuminator emitting light in a second wavelength region; and
    at least one reflector assigned to the first illuminator for determining a position of predefined sections of outer edges of the mask with respect to a mask coordinate system, wherein the reflector is selective with respect to a wavelength so as to cause an essentially complete reflection of light from the first illuminator and to cause essentially no reflection of light from the second illuminator.

2. The metrology tool as recited in claim 1 wherein the reflector is a dichroic mirror.

3. The metrology tool as recited in claim 1 wherein the reflector is attached to the measuring stage.

4. The metrology tool as recited in claim 1 wherein the reflector is attached to a mask frame.

5. The metrology tool as recited in claim 1 wherein the first wavelength region is 400 nm to 750 nm.

6. The metrology tool as recited in claim 1 wherein the second wavelength region is below 400 nm.

7. The metrology tool as recited in claim 6 wherein the UV light comprises light with at least one of the wavelengths 365 nm, 266 nm, 248 nm, 193 nm.

8. A metrology tool for determining a position of structures on a surface of a mask comprising:
    a measuring stage movable in a X-coordinate direction and in a Y-coordinate direction, the mask to be measured being placeable on the measuring stage;
    a first illuminator emitting light from 400 nm to 750 nm;
    a second illuminator emitting light below 400 nm; and
    at least one reflector assigned to the first illuminator for determining a position of predefined sections of outer edges of the mask with respect to a mask coordinate system, the reflector being selective with respect to the wavelength so as to cause an essentially complete reflection of light from the first illuminator and to cause essentially no reflection of the light from the second illuminator.

9. The metrology tool as recited in claim 8 wherein the UV light comprises light with at least one of the wavelengths 365 nm, 266 nm, 248 nm, 193 nm.

10. The metrology tool as recited in claim 8 wherein the reflector is a dichroic mirror.

11. The metrology tool as recited in claim 8 wherein the reflector is attached to the measuring stage.

12. The metrology tool as recited in claim 8 wherein the reflector is attached to a mask frame.

13. A metrology tool for determining a position of structures on a surface of a mask comprising:
    a measuring stage movable in a X-coordinate direction and in a Y-coordinate direction, the mask to be measured being placeable on the measuring stage;
    a first illuminator emitting light from 400 nm to 750 nm;
    a second illuminator emitting light below 400 nm, wherein the UV light comprises light with at least one of the wavelengths 365 nm, 266 nm, 248 nm, 193 nm; and
    at least one dichroic mirror assigned to the first illuminator for determining a position of predefined sections of outer edges of the mask with respect to a mask coordinate system, the dichroic mirror being selective with respect to the wavelength so as to cause an essentially complete reflection of light from the first illuminator and to cause essentially no reflection of the light from the second illuminator.

14. The metrology tool as recited in claim 13 wherein the dichroic mirror is attached to the measuring stage.

15. The metrology tool as recited in claim 13 wherein the dichroic mirror is attached to a mask frame.

* * * * *